June 9, 1931. J. A. ALGER 1,809,662
CONVEYER
Filed Jan. 29, 1929  2 Sheets-Sheet 1
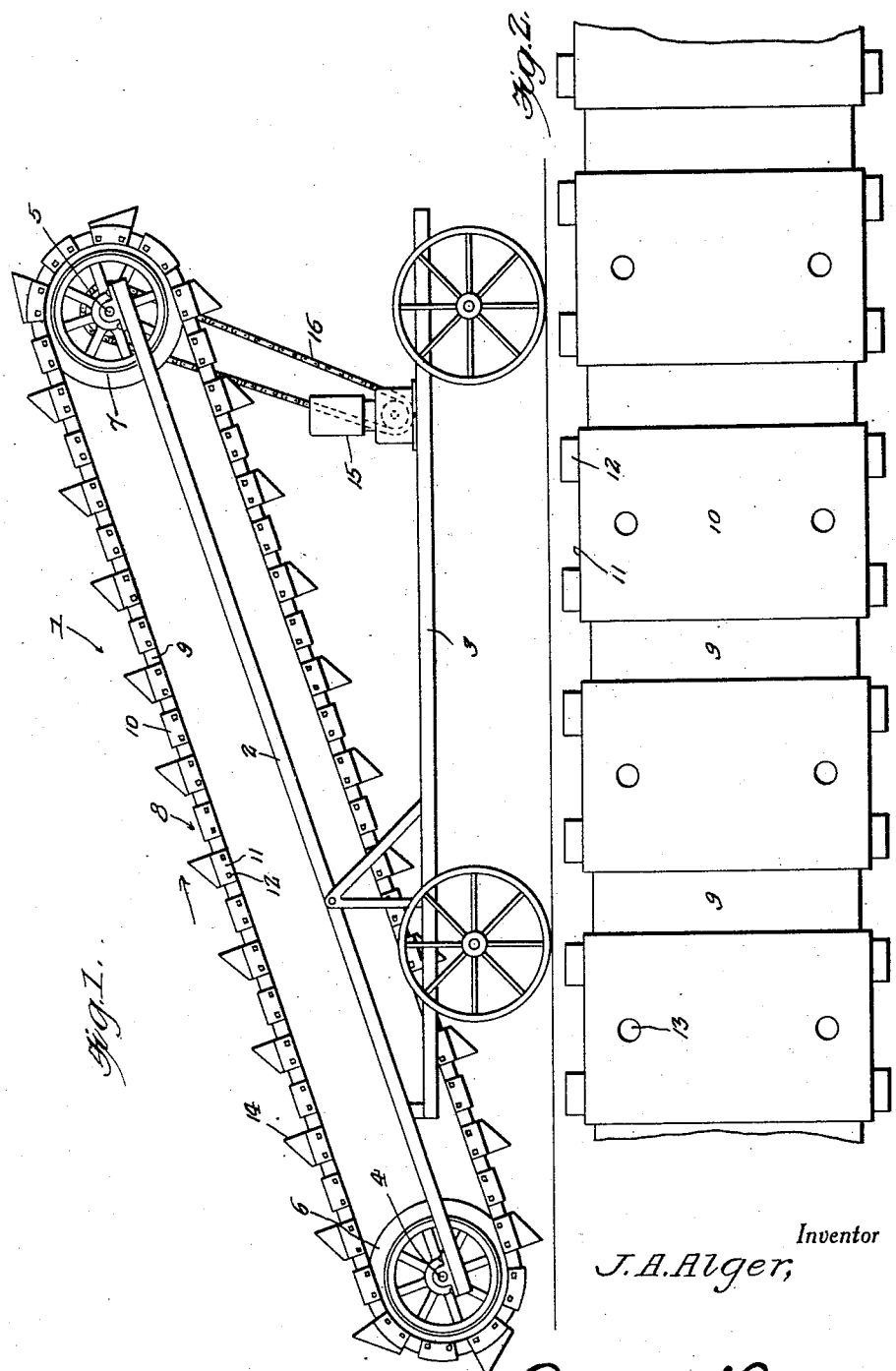
Inventor
J. A. Alger,
By Clarence A. O'Brien
Attorney

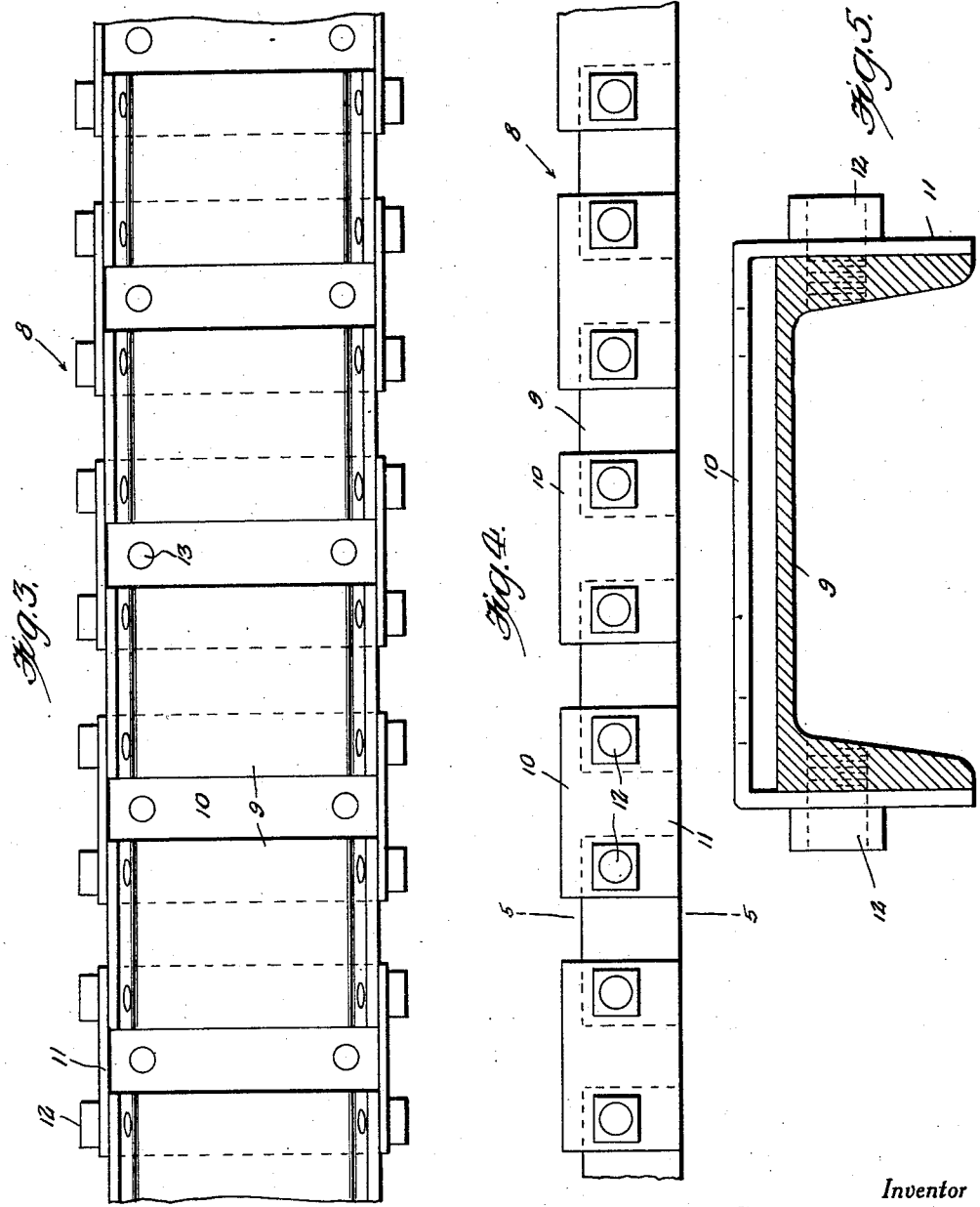

Patented June 9, 1931

1,809,662

UNITED STATES PATENT OFFICE

JOHN ALBERT ALGER, OF MANTUA, OHIO

CONVEYER

Application filed January 29, 1929. Serial No. 335,812.

The present invention relates to improvements in conveyers and has reference more particularly to a conveyer that is to be used in elevating gravel or other granular material.

One of the important objects of the present invention is to provide a conveyer that includes an endless belt of a particular construction, said belt including a series of spaced channel shaped members that are interconnected together by pivoted channel shaped plates and which plates have associated therewith, the elevating buckets.

Another important object of the invention is to provide a conveyer of the above mentioned character that includes pneumatic tired wheels mounted at the respective ends of a suitable frame and over which wheels the endless belt is adapted to travel.

A still further important object of the invention is to provide a conveyer of the above mentioned character that is simple in construction, inexpensive, strong and durable and further well adapted to the purposes for which it is designed.

Other objects and advantages will become apparent during the course of the following description.

In the accompanying drawings, forming a part of this specification, and in which like numerals indicate like parts throughout the same:

Figure 1 is a side elevation of the conveyer embodying my invention,

Figure 2 is a fragmentary top plan view of the endless belt, the buckets being removed, Figure 3 is a bottom plan view thereof.

Figure 4 is a fragmentary side elevation of the endless belt without the buckets and Figure 5 is a sectional view taken approximately on the line 5—5 of Figure 4.

In the drawings wherein for the purpose of illustration is shown the preferred embodiment of my invention, the numeral 1 designates generally my improved conveyer, the same comprising a supporting frame 2 that is mounted rigidly at an inclined position on the wheeled carriage 3.

This frame comprises a pair of parallel spaced longitudinal bars and a transverse shaft 4 is journaled for rotation at the rear end of the frame 2. A similar shaft 5 is journaled for rotation in suitable bearings at the forward raised end of the frame.

Secured on the intermediate portions of the shafts 4 and 5 for rotation therewith between the bars of the frame 2 are the pneumatic tired wheels or pulleys 6 and 7 respectively and this feature is more clearly disclosed in Figure 1 of the drawings.

My improved conveyer further constitutes the provision of an endless belt denoted generally by the numeral 8 adapted to travel over the alined wheels or pulleys 6 and 7. The specific construction of the endless belt 8 will now be described.

A series of channel shaped units 9 are arranged in spaced relation with respect to each other and a series of channel shaped steel plates 10 operatively connect the adjacent channel shaped units together.

Each of the channel shaped units 9 is so constructed as to fit over the tread of the pneumatic tire of each of the wheels or pulleys so as to be propelled by the frictional contact of the tire with the side walls of the unit 9 and upon referring to the drawings, it will be noted that the connecting plates 10 are disposed across the outer faces of the adjacent edge portions of said channel shaped units while the arm portions 11 of the steel plates 10 engage against the outer faces of the respective sides of the channel shaped units 9. The pneumatic tire pulleys not only provide a friction drive for the conveyer but also tends to resiliently support the latter against shocks and jars.

Suitable bolts 12 provide means for operatively connecting the spaced channel shaped units 9 and the overlapping steel plates 10 and to this end, the arms 11 of the channel shaped plates 10 are formed with unthreaded openings through which the unthreaded portion of the shank of the respective bolts project, the sides of the channel shaped units 9 being formed with threaded sockets to accommodate the threaded ends of the bolts as suggested very clearly in Figure 5 of the drawings.

It is also to be understood that the channel shaped steel plates 10 are shaped so as to conform to the channel shaped units 9 and the crown portion of each channel shaped plate 10 is formed with spaced openings 13 whereby a bucket such as is shown at 14 may be detachably secured thereto and upon referring to Figure 1, it will be observed that these buckets are secured on alternate ones of the plates 10.

The means for driving the endless belt 8 includes the provision of a motor 15 mounted on the platform 3 and a sprocket chain 16 cooperates with suitable sprocket wheels associated with the drive shaft of the motor 15 and the outer end of the shaft 5, for operatively connecting the endless belt with the motor.

It will thus be seen from the foregoing description, that I have provided a conveyer that is particularly adapted for use in elevating granular material such as gravel and the like due to its simplicity of construction. The conveyer can be assembled at a very low cost and will be strong and durable and at all times positive and efficient in carrying out the purposes for which it is designed.

While I have disclosed the preferred embodiment of my invention, it is to be understood that various changes in the size, shape and arrangement of parts may be resorted to without departing from the spirit of the invention and the scope of the appended claims.

Having thus described my invention, what I claim as new is:

1. In a conveyer belt of the class described, a friction pulley, a series of spaced channel shaped units adapted to fit over the tread of the pulley so as to be propelled by the frictional contact of the pulley with the side walls of the units, a series of channel shaped plates arranged over the adjacent edge portions of the respective channel shaped units, means for securing the channel shaped units to the adjacent plates, and buckets arranged on the crown portions of the channel shaped plates.

2. In a conveyer, a support, pulley wheels arranged on the support in spaced relation and in alinement with each other, said pulley wheels having pneumatic tread, an endless belt adapted to travel over the pulley wheels, said belt comprising a series of spaced channel shaped units adapted to fit over the pulley wheel so as to be propelled by the frictional contact of the pneumatic treads of the wheel with the side walls of the units, channel shaped plates arranged over the outer faces of the adjacent pairs of channel shaped units and being operatively connected thereto, buckets carried by the crown portions of certain ones of said channel shaped plates, and means for driving the endless belt around the pulley wheels.

3. A conveyer of the class described comprising in combination, a support, pneumatic tired pulley wheels mounted on the support, an endless belt adapted to travel around the tired pulley wheels, said endless belt comprising a series of channel shaped units arranged in spaced relation with respect to each other, a series of channel shaped metallic plates arranged on the outer faces of the adjacent pairs of said channel shaped units and being operatively connected thereto, buckets secured on the crown portions of said channel shaped plates, and means for driving the endless belt around the tired pulley wheels.

4. A conveyer belt comprising pneumatic tired pulleys, a series of spaced channel shaped units adapted to ride upon the pneumatic tires of the said pulleys, and to be frictionally propelled by the contact of the tires with the channel walls, a series of channel shaped plates overlapping the edge portions of the adjacent units, the sides of the channel shaped plates being formed with unthreaded openings, the sides of the channel shaped units being formed with threaded openings adapted to communicate with the respective unthreaded openings, bolts extending through the aforesaid openings, the threaded ends of the bolts being disposed within the threaded openings in the sides of the channel shaped unit, and means for rotating the pulleys.

5. A conveyer belt comprising a pair of pneumatic tired pulleys, a metallic conveyer adapted to travel around said pulleys and including inner and outer pivotally connected series of channeled members, the channeled members of the inner series being adapted to be frictionally engaged by the pneumatic tires of the said pulleys and the channeled members of the outer series serving as carrier units, and buckets selectively mounted on the carrier units.

In testimony whereof I affix my signature.

JOHN ALBERT ALGER.